United States Patent [19]

Hentzschel

[11] Patent Number: 5,117,531
[45] Date of Patent: Jun. 2, 1992

[54] SUCTION OR BLOWING APPARATUS

[75] Inventor: Wolfgang Hentzschel, Filderstadt, Fed. Rep. of Germany

[73] Assignee: Electrostar Schöttle GmbH & Co., Reichenbach/Fils, Fed. Rep. of Germany

[21] Appl. No.: 519,729

[22] Filed: May 7, 1990

[30] Foreign Application Priority Data

May 8, 1989 [DE] Fed. Rep. of Germany ....... 8905742

[51] Int. Cl.⁵ ............................................. A47L 5/18
[52] U.S. Cl. .................................... 15/409; 417/151; 417/197
[58] Field of Search .................. 15/409; 417/151, 177, 417/197

[56] References Cited

U.S. PATENT DOCUMENTS

| 2,475,832 | 7/1949 | Gilliland | 15/409 X |
| 3,448,917 | 6/1969 | Dewey et al. | 417/151 |
| 3,499,393 | 3/1970 | Bent | 417/197 X |
| 3,720,482 | 3/1973 | Tell | 417/197 X |
| 4,200,425 | 4/1980 | Teodorescu et al. | 417/197 X |

FOREIGN PATENT DOCUMENTS

| 2439069 | 2/1976 | Fed. Rep. of Germany | 15/409 |
| 269446 | 7/1970 | U.S.S.R. | 15/409 |
| 1253621 | 8/1986 | U.S.S.R. | 15/409 |

Primary Examiner—Chris K. Moore
Attorney, Agent, or Firm—Toren, McGeady & Associates

[57] ABSTRACT

A suction or blowing apparatus and/or pneumatic conveying apparatus for different types of dust and bulk material. The apparatus includes two tubes arranged one within the other, wherein propellant air is admitted to the inner tube. To increase the suction effect, the outer tube is also connected to a propellant air-generating device. The tubes are arranged concentrically within each other and form an annular injection nozzle.

7 Claims, 2 Drawing Sheets

SUCTION OR BLOWING APPARATUS

BACKGROUND OF THE INVENTION

1. Field of the Invention

The present invention relates to a suction or blowing apparatus and/or pneumatic conveying apparatus for conveying various types of dust and bulk material, particularly difficultly pneumatically conveyable material such as leaves, cotton, chips or the like. The apparatus includes two tubes which are arranged one within the other, wherein the inner tube projects into a narrowing portion of the outer tube and the inner tube and the outer tube form an injection nozzle, wherein propellant air can be admitted to one of the tubes.

2. Description of the Related Art

An apparatus of this type is already known from German Utility Model 8 317 867.8. The apparatus is a vacuum cleaner for motor vehicles, wherein the inner tube is connected to the exhaust pipe of the automobile and the outer tube is connected to a suction hose. In accordance with the air jet-vacuum pump principle, the flow velocity of the exhaust gases is utilized in order to generate a negative pressure which acts on the suction hose to create the suction effect. However, this suction effect is not very great in this known apparatus, because the suction duct consisting of suction hose and outer tube has a rectangular deflection in the region of connection of the two components, so that a high resistance to the flow of the air to be sucked off occurs. The narrowing portion of the outer tube is another disadvantage because the narrowing portion can be clogged with the material being conveyed, particularly difficultly pneumatically conveyable material.

SUMMARY OF THE INVENTION

It is the object of the present invention to provide an apparatus of the above-described type in which the suction effect is increased and in which an as free as possible passage for difficultly pneumatically conveyable material is achieved.

In accordance with the present invention, this object is met in an apparatus of the above-described type by providing that the outer tube can be connected to a propellant air-generating device.

As a result of the feature according to the present invention, the material which has been sucked in flows through a straight inner tube which has a low resistance to flow and no narrowing portion which is susceptible to clogging. The propellant air flows through the outer tube and the flow velocity of the propellant air is increased at the narrowing portion of the outer tube. This increases the negative pressure in the inner tube and, thus, the suction effect.

In accordance with a particularly advantageous feature, the tubes are arranged concentrically within each other and form an injection nozzle which is annular in the cross-section thereof. Accordingly, the suction effect can be achieved uniformly over the circumference of the outer tube.

In accordance with another feature of the invention, the tubes have a rectangular cross-section and the injection nozzle is formed by an outwardly directed bevel of the inner tube.

In accordance with a further development of the invention, the inner tube has a funnel-like widening portion at its end projecting into the narrowing portion of the outer tube. As a result, turbulence of the propellant air and the suction air at the end of the inner tube is essentially avoided and an improved suction effect is achieved. The funnel-like widening portion is advantageously formed in a simple manner by bevelling the inner surface of the inner tube.

In accordance with a preferred embodiment of the invention, the propellant air-generating device is mounted laterally on the tubes and is connected to the injection nozzle to communicate therewith. As a result, the apparatus according to the present invention can be easily transported as a unit.

In accordance with a further development of the invention, the propellant air is introduced perpendicularly to the outer tube into an annular duct formed between the two tubes and is conveyed through this annular duct to the injection nozzle. As a result, the compressed air can be uniformly supplied to the injection nozzle without requiring additional lines.

A further development of the invention provides that the injection nozzle has an outlet opening which is annular in cross-section and is small in comparison to the diameter of the inner tube. This significantly increases the flow velocity of the propellant air when it enters the inner tube, so that a greater negative pressure is generated and the suction force is increased.

In accordance with a further feature of the invention, a diffusor is mounted downstream of the injection nozzle. The diffusor allows the air to expand, so that the effect of the injection nozzle can be increased.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 2:
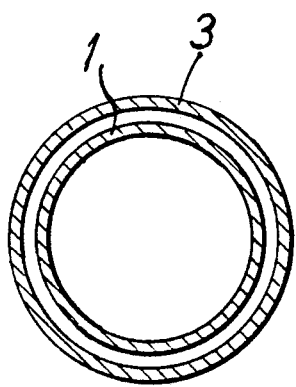
FIG. 2 is a sectional view taken along sectional lines A—A of FIG. 1, wherein the inner and outer tubes are circular.
Figure 3:
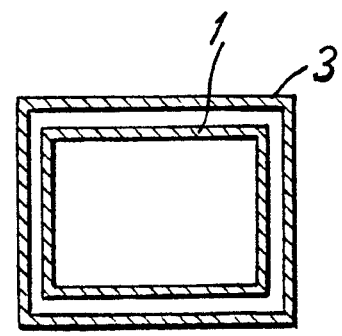
FIG. 3 is a sectional view taken along sectional lines A—A of FIG. 1, wherein the inner and outer tubes are rectangular.

As illustrated in the drawing, the suction or blowing apparatus according to the present invention has two concentrically arranged tubes, wherein the inner tube 1 projects into the outer tube 3 up to a nozzle-like constriction 2. As shown in FIG. 2, a duct 4 which is annular in cross-section is formed between the outer tube 3 and the inner tube 1. As shown in FIG. 3, the duct 4 may also be formed by rectangular tubes 1 and 3. At an end 5 of the inner tube 1 which projects into the constriction 2, the annular duct 4 has the form of an injection nozzle 6. In the case of rectangular tubes 1 and 3, the injection nozzle 6 is an asymmetrical injection tongue.

Figure 1:
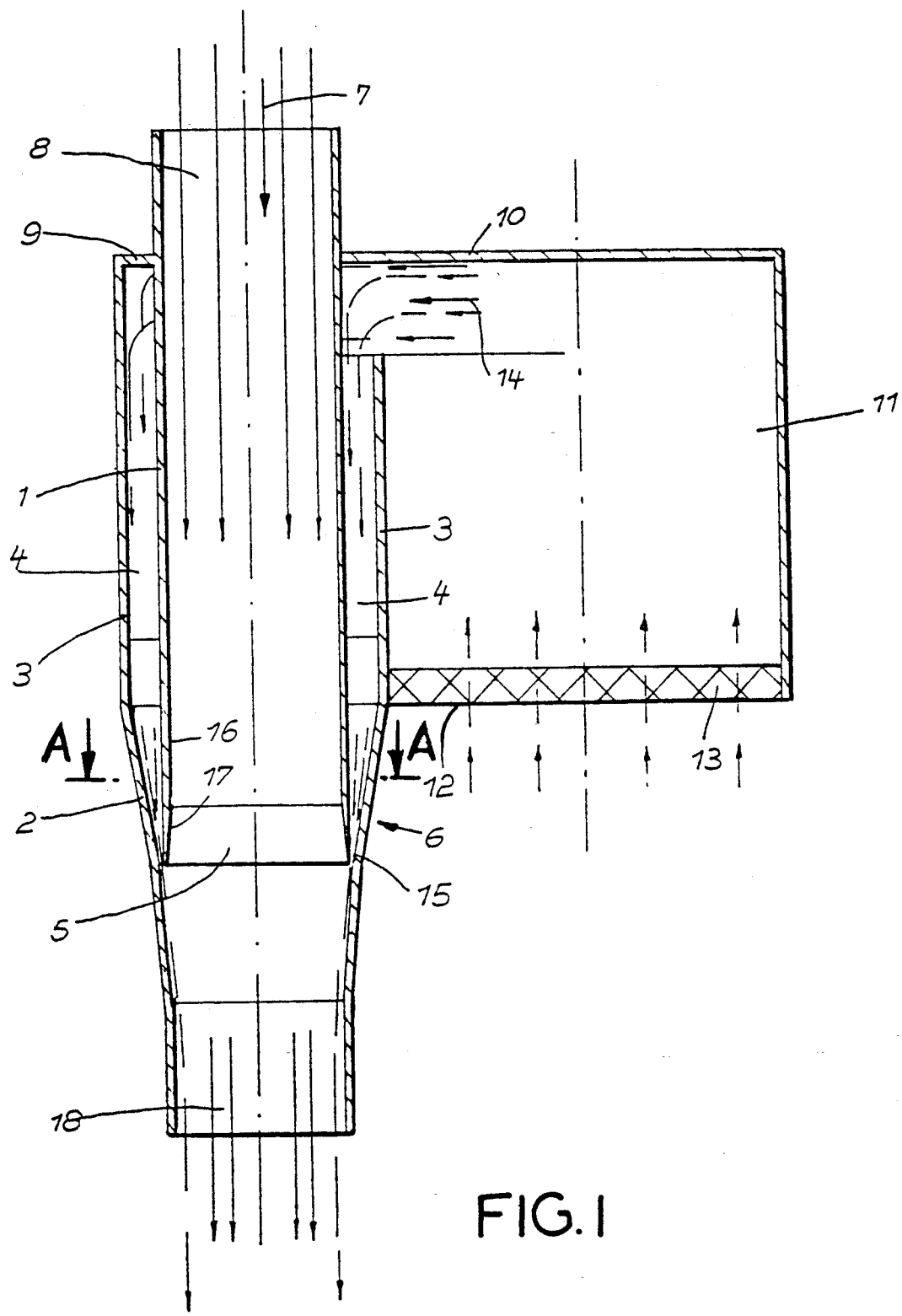
FIG. 1 is a longitudinal sectional view of the apparatus according to the present invention.

The outer tube 3 is fastened and closed in an air-tight manner by a plate 9 at the rearward end 8 of the inner tube 1 as seen in the direction of arrow 7. The plate 9 simultaneously serves as the rear wall 10 of a propellant air-generating device 11 and is curved, not illustrated, to provide advantageous flow conditions for supplying the propellant air to the injection nozzle 6. The device 11 for generating propellant air is a compressed air source, for example, a blower which is schematically illustrated in FIG. 1, and is fastened with its front wall 12 to the outer tube 3 and includes an intake filter 13. The device 11 is in communication with the injection nozzle 6 through duct 4. The propellant air flows out of the propellant air-generating device 11 in the direction of arrow 14 and is then deflected in a manner advantageous to flow conditions into the duct 4 between the outer tube 3 and the inner tube 1. The air then flows parallel to the direction of arrow 7 into the portion of the duct 4 constructed as the injection nozzle 6 and through a narrow annular outlet opening 15 into the interior of the outer tube 3.

The high flow velocity of the propellant air emerging from the nozzle opening 15 causes the air particles in the interior of the outer tube 3 to be carried in the direction of arrow 7, so that a negative pressure builds up at the end 5 of the inner tube 1 projecting into the constriction 2. This results in a suction effect of the inner tube 1 in the direction of arrow 7.

In order to reduce turbulence of the suction air and compressed air at the forward end 5 of the inner tube 1 as seen in the direction of arrow 7, the inner tube 1 is provided at the inner side 16 thereof with an outwardly directed bevel 17. The outer tube 3 and the inner tube 1 have connections for extension tubes, hoses or the like at the forward ends 18 or rearward ends 8 as seen in the direction of arrow 7.

A diffuser 19 is provided downstream of the injection nozzle 6. The diffuser 19 increases the intake effect of the inner tube 1 in direction of arrow 7.

While a specific embodiment of the invention has been shown and described in detail to illustrate the application of the inventive principles, it will be understood that the invention may be embodied otherwise without departing from such principles.

I claim:

1. A suction or blowing apparatus and/or pneumatic conveying apparatus for conveying various of types of dust and bulk material, particularly difficulty pneumatically conveyable material such as leaves, cotton, chips or the like, the apparatus comprising an outer tube and an inner tube arranged within the outer tube, wherein the inner tube has a constant outer diameter and projects into a narrowing portion of the outer tube, the inner tube and the outer tube forming an injection nozzle at the narrowing portion, a propellant air-generating device being directly connected to the outer tube, the propellant air-generating device being mounted laterally on the tubes and connected to the tubes such that the propellant air-generating device is in communication with the injection nozzle.

2. The apparatus according to claim 1, wherein the inner tube is arranged concentrically within the outer tube and the injection nozzle is annular in cross-section.

3. The apparatus according to claim 1, wherein the inner tube has an end projecting into the narrowing portion of the outer tube, the end of the inner tube comprising a funnel-like widening portion.

4. The apparatus according to claim 3, wherein the propellant air-generating device includes an intake filter.

5. The apparatus according to claim 1, comprising diffusor means connected to the injection nozzle.

6. The apparatus according to claim 5, wherein the diffusor means is mounted downstream of the injection nozzle.

7. The apparatus according to claim 1, wherein the tubes have a rectangular cross-section, the injection nozzle being formed by an outwardly directed bevel of the inner tube.

* * * * *